United States Patent
Grieco et al.

(10) Patent No.: US 8,876,065 B2
(45) Date of Patent: Nov. 4, 2014

(54) FLAP ROLLER ARRANGEMENT, FLAP ASSEMBLY, AND METHOD FOR REMOVING A ROLLER ASSEMBLY FROM A FLAP FITTING

(75) Inventors: James R. Grieco, Bloomingdale, GA (US); Gary Pakhlevanyan, Pooler, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 168 days.

(21) Appl. No.: 13/279,116

(22) Filed: Oct. 21, 2011

(65) Prior Publication Data

US 2013/0099061 A1 Apr. 25, 2013

(51) Int. Cl.
*B64C 3/58* (2006.01)
*B64C 9/02* (2006.01)
*B64C 9/16* (2006.01)

(52) U.S. Cl.
CPC .. *B64C 9/02* (2013.01); *Y02T 50/44* (2013.01); *Y02T 50/32* (2013.01); *B64C 9/16* (2013.01)
USPC ......... 244/213; 244/99.2; 244/99.3; 244/214; 244/215

(58) Field of Classification Search
USPC ................................. 244/99.2, 99.3, 213–215
See application file for complete search history.

(56) References Cited

U.S. PATENT DOCUMENTS

| | | | |
|---|---|---|---|
| 2,620,147 A | 12/1952 | Butler et al. | |
| 4,180,222 A * | 12/1979 | Thornburg | 244/225 |
| 4,471,928 A | 9/1984 | Cole | |
| 4,753,402 A * | 6/1988 | Cole | 244/210 |
| 4,838,503 A * | 6/1989 | Williams | 244/214 |
| 5,651,513 A | 7/1997 | Arena | |
| 6,149,105 A * | 11/2000 | Jaggard | 244/214 |
| 7,249,735 B2 * | 7/2007 | Amorosi et al. | 244/99.2 |
| 8,025,257 B2 * | 9/2011 | Gyuricsko et al. | 244/214 |
| 8,393,568 B2 * | 3/2013 | Maresko et al. | 244/99.2 |
| 2007/0102587 A1 * | 5/2007 | Jones et al. | 244/214 |
| 2009/0019665 A1 * | 1/2009 | Kelley | 16/105 |
| 2009/0146014 A1 * | 6/2009 | Gyuricsko et al. | 244/213 |
| 2010/0187367 A1 | 7/2010 | Dahl | |
| 2011/0006154 A1 * | 1/2011 | Maresko et al. | 244/99.2 |
| 2011/0042525 A1 * | 2/2011 | Parker | 244/213 |
| 2011/0220760 A1 * | 9/2011 | Gyuricsko et al. | 244/99.2 |

OTHER PUBLICATIONS

New Jersey instituet of Technology, 'Design of Shaft' pp. 8, 10.*
"Making PTO Connections", The Pennysylvania State University, p. 2, 2004.*

(Continued)

*Primary Examiner* — Isam Alsomiri
*Assistant Examiner* — Assres H Woldemaryam
(74) *Attorney, Agent, or Firm* — Ingrassia, Fisher & Lorenz, P.C.

(57) ABSTRACT

A flap roller arrangement for supporting a flap on a wing of an aircraft is disclosed herein. The flap roller arrangement includes, but is not limited to, a roller assembly that is configured for rolling engagement with a flap track of the wing and for engagement with a flap fitting. The flap roller arrangement further includes a retaining member that is removably coupled to the roller assembly. The roller assembly is configured to egress through an opening in the flap fitting in a direction away from the flap track. The retaining member is configured to obstruct egress of the roller assembly through the opening when the retaining member is coupled to the roller assembly. The roller assembly is enabled to egress through the opening when the retaining member is removed from the roller assembly.

20 Claims, 18 Drawing Sheets

(56) References Cited

OTHER PUBLICATIONS

International Searching Authority, PCT International Search Report and Written Opinion mailed Jul. 5, 2013 in International Application No. PCT/US2012/061328.

The International Bureau of WIPO, International Preliminary Report on Patentability for International Application No. PCT/US2012/061328, mailed May 1, 2014.

* cited by examiner

US 8,876,065 B2

FLAP ROLLER ARRANGEMENT, FLAP ASSEMBLY, AND METHOD FOR REMOVING A ROLLER ASSEMBLY FROM A FLAP FITTING

TECHNICAL FIELD

The present invention generally relates to an aircraft and more particularly, relates to a flap roller arrangement, a flap assembly, and a method for removing a roller assembly from a flap fitting.

BACKGROUND

Flaps are a component of an aircraft's wing that extend and retract from the wing, as required by the pilot of an aircraft during aircraft operations. When additional lift is desired, the pilot will extend the flaps, thereby increasing the chord length and camber of the wing and, as a result, increasing wing's ability to generate lift. This is usually desirable only during take offs and landings. Once the aircraft is in flight, the pilot's goal is to reduce drag. Accordingly, after take off, the flaps are typically retracted into the wing to remove them from the airstream flowing past the wing.

To move between a retracted and a deployed position, the flaps are equipped with roller assemblies that enable the flap to translate with respect to the wing. The roller assemblies are configured to roll in flap tracks that are secured to the wings and that provide the roller assemblies with a pathway which, in turn, controls the movement of the flaps with respect to the wing. The roller assemblies are secured to the flaps using a flap fitting. From time to time, a roller assembly will require either service or replacement or both. This, in turn, requires that the roller assembly be removed from the flap fitting.

Removing a roller assembly from a flap fitting has historically been a very time consuming and labor intensive activity. Conventional roller assemblies and flap fittings are designed such that, in order to remove the roller assembly from the flap fitting, the roller assembly has to translate out of the flap fitting in a direction towards the flap track. This is due to their construction. A conventional roller assembly includes a generally cylindrical shaft and a roller portion that is rotatably mounted to the shaft at or near one end of the shaft. The other end of the shaft is conventionally inserted into an opening in the flap fitting and supports the roller portion in a cantilever manner. The shaft and the opening in the fitting are typically dimensioned so as to have substantially the same diameter so as to minimize any rocking motion of the shaft that might result as the flaps are extended and retracted. Conventionally, the roller portion has a larger diameter than the shaft. The larger diameter of the roller portion obstructs translating movement of the roller assembly through the opening in the flap fitting, leading to the result that a conventional roller assembly can only be removed by translating the roller assembly out of the opening in the fitting in a direction towards the flap track.

Because the flap track obstructs such translating movement, the flaps are typically removed from the wing in order to remove the roller assemblies. Removal of the flaps from the wing can trigger additional rigging/inspection requirements when the flaps are reinstalled. These additional rigging/inspection requirements can add to the down-time experienced by an aircraft when a roller assembly needs to be serviced. Because of the labor requirements and the added rigging/inspection requirements, anytime that the flap is removed from the wing to replace a single roller assembly, maintenance crews will typically replace all roller assemblies so as to avoid the need to frequently remove, reinstall, and then recertify the flaps. As a result, roller assemblies are replaced when replacement is not necessary, leading to waste and added expense.

Accordingly, it is desirable to provide a roller arrangement that permits easy removal and replacement of the roller assemblies. In addition, it is desirable to provide a method that facilitates removal of the roller assembly from the flap fitting. Furthermore, other desirable features and characteristics will become apparent from the subsequent detailed description and the appended claims, taken in conjunction with the accompanying drawings and the foregoing technical field and background.

BRIEF SUMMARY

A flap roller arrangement, a flap assembly, and a method for removing a roller assembly from a flap fitting are disclosed herein.

In a first non-limiting embodiment, the flap roller arrangement includes, but is not limited to, a roller assembly that is configured for rolling engagement with a flap track of the wing and for engagement with a flap fitting. The flap roller arrangement still further includes a retaining member that is removably coupled to the roller assembly. The roller assembly is configured to egress through an opening in the flap fitting in a direction away from the flap track. The retaining member is configured to obstruct egress of the roller assembly through the opening when the retaining member is coupled to the roller assembly. The roller assembly is enabled to egress through the opening when the retaining member is removed from the roller assembly.

In another non-limiting embodiment, the flap assembly includes, but is not limited to, a flap. The flap assembly further includes a flap fitting that is attached to the flap. The flap fitting includes an opening. The flap assembly further includes a roller assembly that is mounted within the opening. The roller assembly is configured for rolling engagement with a flap track of the wing. The flap assembly still further includes a retaining member that is removably coupled to the roller assembly. The roller assembly is configured to egress through the opening in a direction away from the flap track. The retaining member is configured to obstruct egress of the roller assembly through the opening when the retaining member is coupled to the roller assembly. The roller assembly is enabled to egress through the opening when the retaining member is removed from the roller assembly.

In another non-limiting embodiment, the method includes providing a flap roller arrangement seated in the flap fitting, the flap roller arrangement including a roller assembly configured for rolling engagement with a flap track of the wing and for engagement with a flap fitting, and further including a retaining member removably coupled to the roller assembly, the roller assembly being configured to egress through an opening in the flap fitting in a direction away from the flap track, the retaining member being configured to obstruct egress of the roller assembly through the opening when the retaining member is coupled to the roller assembly, and the roller assembly being enabled to egress through the opening when the retaining member is removed from the roller assembly. The method further includes removing the retaining member from the roller assembly. The method still further includes removing the roller assembly through the opening in a direction away from the flap track.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

A flap roller arrangement is disclosed herein. Whereas conventional roller assemblies include a roller member that has a diameter which is larger than the opening in the fitting in which the roller assembly is seated, the flap roller arrangement disclosed herein includes a roller assembly having a roller member that is dimensioned to fit through the opening in the flap fitting. This, in turn, permits the roller assembly to be translated through the opening in the flap fitting in a direction away from the flap track. As a result, there is no longer a need to remove the flap from the wing in order to remove the roller assembly for service and/or replacement.

To inhibit the roller assembly from translating away from the flap track and through the opening in the fitting at times when such egress is not desired, the flap roller arrangement further includes a retaining member that is designed and configured to obstruct movement of the roller assembly through the opening in the flap fitting. The retaining member is configured to be removably coupled to the roller assembly. Thus, when the retaining member is coupled to the roller assembly, the roller assembly is prevented from translating away from the flap track through the opening in the flap fitting and when the retaining member is removed from the roller assembly, the roller assembly is free to translate away from the flap track through the opening in the flap fitting.

A greater understanding of the embodiments of the flap roller arrangement and the embodiments of the method for removing the flap roller arrangement from a flap fitting may be obtained through a review of the illustrations accompanying this application together with a review of the detailed description that follows.

Figure 1:
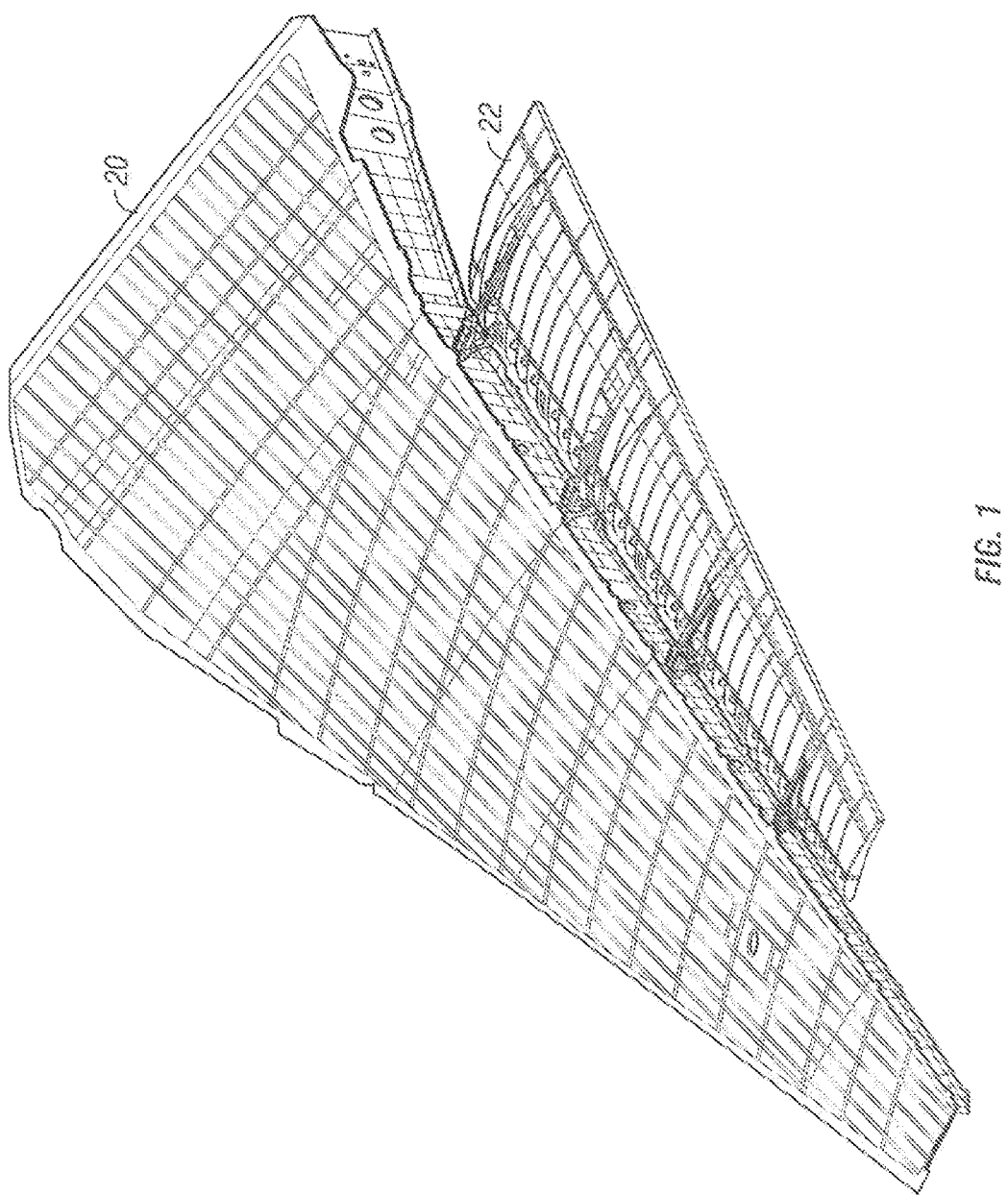
FIG. 1 is an environmental perspective view illustrating a wing and flap.

FIG. 1 is an environmental perspective view illustrating a wing 20 and flap 22 that interface with one another via, among other mechanisms, the flap roller arrangement of the present disclosure. Flap 22 is configured to extend and retract with respect to wing 20 to increase lift and to reduce drag, respectively. In FIG. 1, flap 22 is in a retracted position within wing 20 which has been illustrated with a rearward portion removed to reveal flap 22. While the context of this discussion is with respect to aircraft in general and more particularly with respect to wings and flaps, it should be understood that the teachings disclosed herein are not limited to such usage but are instead compatible with a wide range of applications. The teachings disclosed herein may be implemented in any application where two components are movably engaged with one another and wherein such movement is achieved through the use of one or more roller assemblies attached to one component that engage with one or more roller tracks on the other components.

Figure 2:
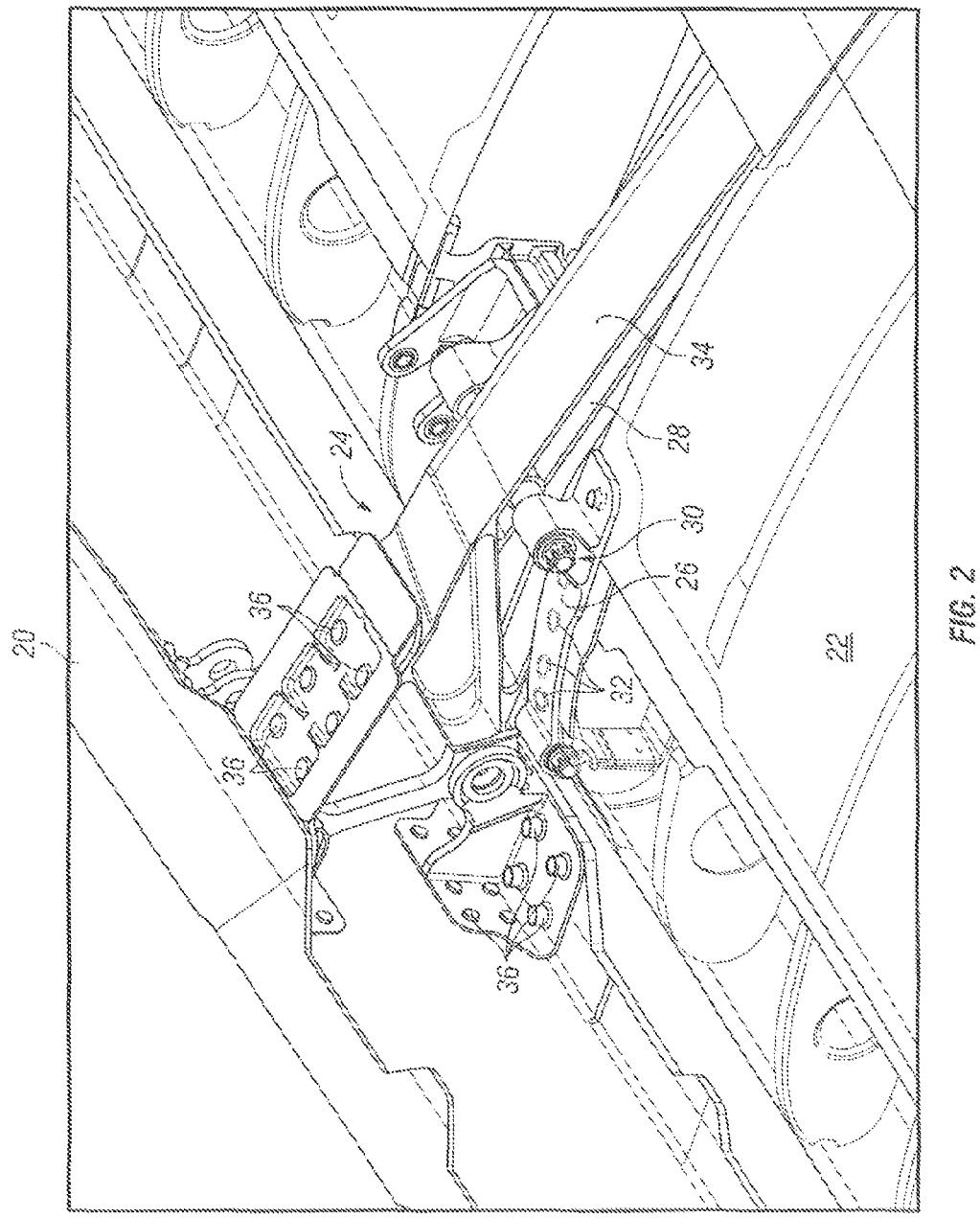
FIG. 2 is an expanded perspective view illustrating an interface between the wing and the flap of FIG. 1, the interface including a flap fitting, a flap track, and an embodiment of a flap roller arrangement made in accordance with the teachings of the present disclosure.

FIG. 2 is an expanded perspective view illustrating a portion of wing 20 and flap 22. Also illustrated in FIG. 2 is an interface 24 between wing 20 and flap 22. Interface 24 includes a flap fitting 26, a flap track 28, and an embodiment of a flap roller arrangement 30 made in accordance with the teachings of the present disclosure. As illustrated in FIG. 1, four interfaces 24 are required to attach flap 22 to wing 20. In other embodiments, a greater or lesser number of interfaces 24 may be required depending upon the size and the weight of the wing and the flap being connected.

Flap fitting 26 is attached to flap 22. Flap fitting 26 may comprise any suitable material including any suitable metal and/or composite material having sufficient strength and durability to support flap 22 on wing 20. As discussed and illustrated below, flap fitting 26 includes multiple openings that are configured to receive a corresponding number of flap roller arrangements 30 and to support such flap roller arrangements 30 in a cantilever manner to allow a protruding portion of flap roller arrangement 30 to extend into flap track 28 as shown. Flap fitting 26 may be attached to flap 22 in any suitable manner. In the illustrated embodiment, flap fitting 26 has been attached to flap 22 via the use of threaded fasteners 32. In other embodiments, any other suitable means or mechanism for joining flap fitting 26 to flap 22 including, but not limited to, the use of rivets and welds, may alternatively be used.

Flap track 28 comprises a generally U-shaped channel having an opening that faces in the direction of flap 22. In the embodiment illustrated in FIG. 2, flap track 28 is defined in a pylon 34. Pylon 34 defines a second flap track (not shown) arranged in back-to-back fashion with flap track 28 for the purposes of engaging with a flap roller arrangement that is associated with another portion of flap 22. Pylon 34 is attached in a cantilever manner to a rearward portion of wing 20. Pylon 34 is attached to wing 20 via threaded fasteners 36. In other embodiments, any other suitable means or mechanism for joining pylon 34 to wing 20 including, but not limited to, the use of rivets and welds, may be used.

Figure 3:
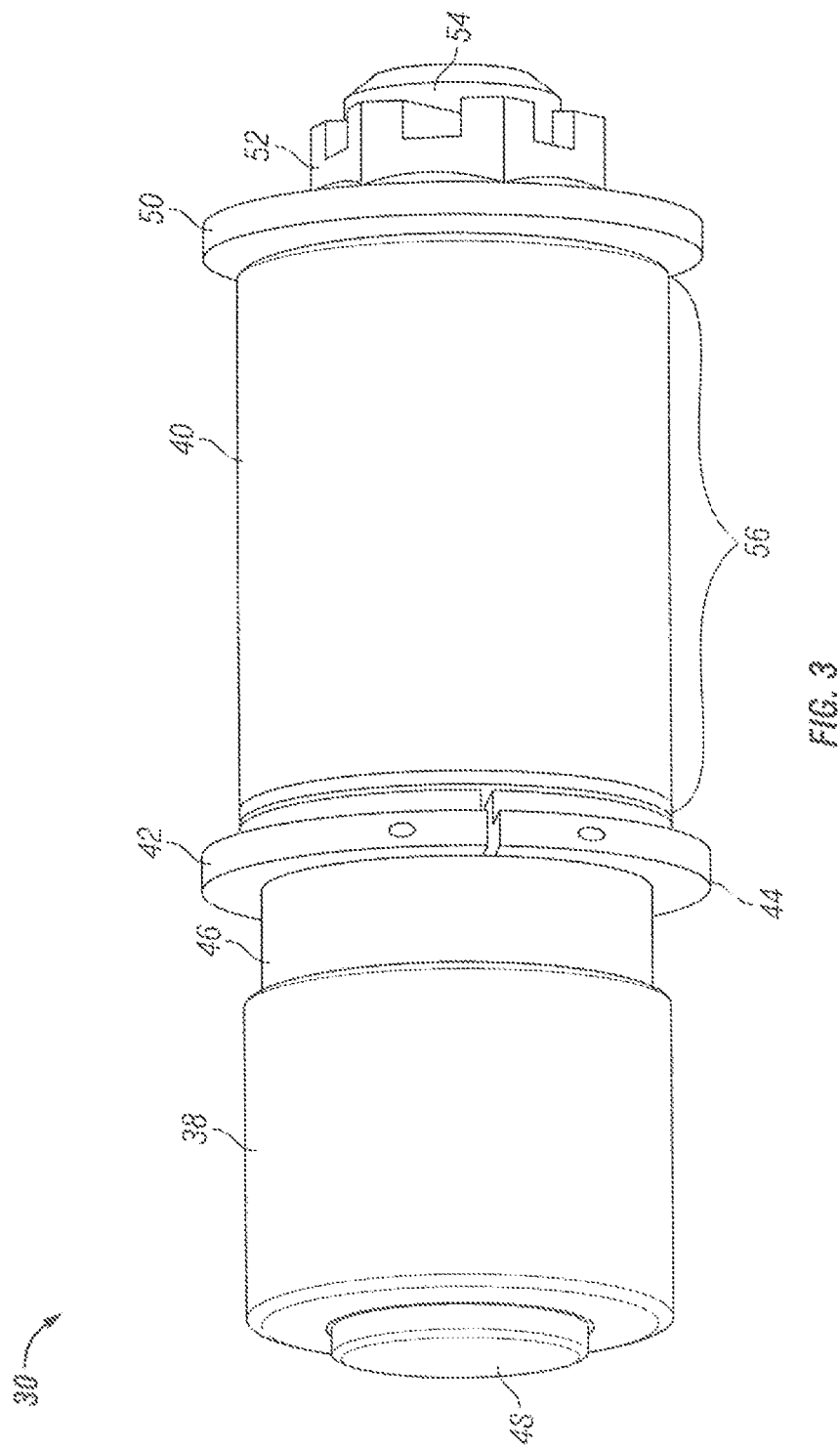
FIG. 3 is a perspective view illustrating the flap roller arrangement of FIG. 2.

FIG. 3 is a perspective view illustrating flap roller arrangement 30. With continuing reference to FIGS. 1-2, flap roller arrangement 30 is configured to be mounted within an opening in flap fitting 26, to be received within flap track 28, and is further configured for rolling engagement with the upper and lower surfaces forming the U-shaped channel of flap track 28. Configured in this manner, flap roller arrangement 30 is enabled to both support flap 22 and to facilitate the extension and retraction of flap 22 with respect to wing 20.

In an embodiment, flap roller arrangement 30 includes a roller member 38, a shaft member 40, a retaining member 42, a retaining member 44, a shoulder portion 46, a sliding member 48, a washer 50, a castellated nut 52, and a threaded end 54. In other embodiments, as discussed below, flap roller arrangement 30 may be configured differently and/or may have different configurations. Each of these components may be comprised of any suitable material including, but not limited to, metals and composite materials.

In the embodiment illustrated in FIG. 3, shaft member 40 is an axisymmetric component that extends substantially the entire axial length of flap roller arrangement 30. Shaft member 40 serves as a central component of flap roller arrangement 30, providing support and attachment points for each of the other components. In the illustrated embodiment, shaft member 40 has a varying diameter along its axial length. A central portion 56 of shaft member 40 has the largest diameter found on shaft member 40 and is configured to be received within an opening of flap fitting 26. Central portion 56 is further configured to conform substantially to the contours of such opening so as to be substantially free of shake, rattle, vibration, and other movement with respect to flap fitting 26.

At the right axial end of shaft member 40 (from the perspective of FIG. 3), threaded end 54 protrudes through castellated nut 52. Threaded end 54 has a diameter that is smaller than the diameter of central portion 56. Threaded end 54 is in threaded engagement with castellated nut 52 and these two components cooperate to retain washer 50 in an engaged relationship with flap fitting 26. Washer 50 has an outer diameter that exceeds the inner diameter of the opening that houses the central portion 56 and thereby obstructs translating movement of flap roller arrangement 30 in a direction towards flap track 28.

Figure 6:
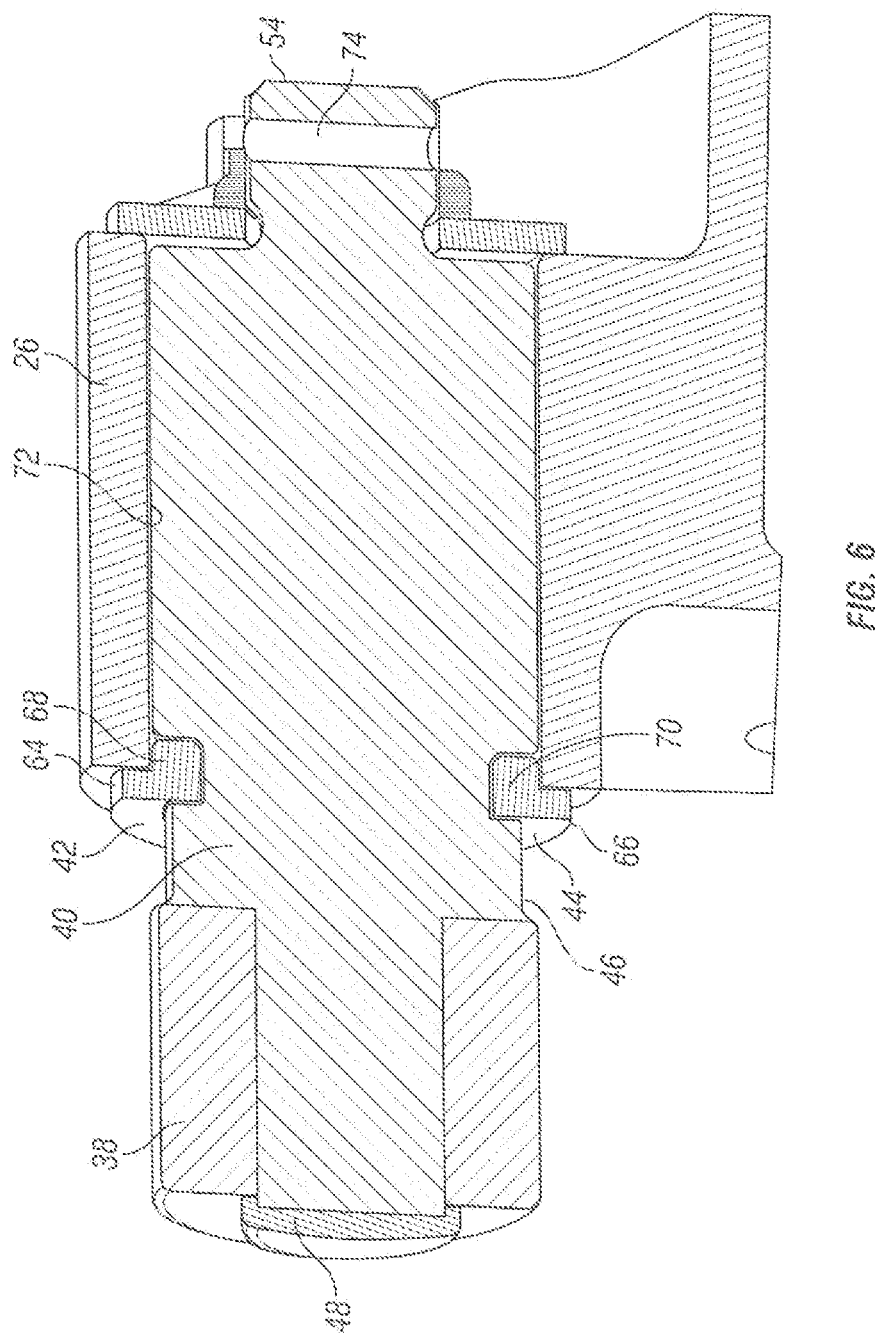
FIG. 6 is a cross sectional, perspective view of the flap roller arrangement taken along section line 6-6 of FIG. 5 and a portion of the flap fitting of FIG. 2.

Adjacent to a left end of central portion 56 (from the perspective of FIG. 3), shaft member 40 defines a radially inwardly extending notch (as best seen in FIG. 6) that extends around an entire circumference of shaft member 40. At the location of this notch, shaft member 40 has a diameter is smaller than the diameter of central portion 56. The notch is configured to receive retaining member 42 and retaining member 44.

To the immediate left of the radially inwardly extending notch is shoulder portion 46. Shoulder portion 46 has a diameter that exceeds the diameter of the radially inwardly extending notch and therefore is configured to axially engage retaining member 42 and retaining member 44. As castellated nut 52 is tightened around threaded end 54, washer 50 engages flap fitting 26. This engagement causes shaft member 40 to translate in a direction away from flap track 28. As shaft member 40 translates in a direction away from flap track 28, shoulder portion 46 engages retaining member 42 and retaining member 44 causing retaining member 42 and retaining member 44 to also translate in a direction away from flap track 28. This, as discussed later, will drive retaining member 42 into the opening in flap fitting 26.

To the immediate left of shoulder portion 46 on shaft member 40 is a roller-member-mounting-portion of shaft member 40 (best seen in FIG. 3). The diameter of shaft member 40 at the roller-member-mounting-portion drops to approximately the same diameter as that of threaded end 54 (best seen in FIG. 3). Roller member 38 is coaxially mounted on to shaft member 40 at the roller-member-mounting-portion and is configured for rolling engagement there with. Any suitable means and/or mechanism effective to enable roller member 38 to rotate with respect to shaft member 40 including, but not limited to, the use of friction reducing substances and/or the use of mechanical devices may be utilized.

In the illustrated embodiment, sliding member 48 is a disk-like body attached to an axial and of shaft member 40. Sliding member 48 is configured to protect shaft member 40 from engagement with an internal surface of flap track 28 during extension and/or retraction of flap 22. Sliding member 48 may comprise any suitable material including any metal and/or composite material effective to slide with respect to an internal surface of flap track 28.

Retaining member 42 and retaining member 44 are substantial mirror images of one another and are configured to form an annular flanged ring around shaft member 40 when positioned within the notch located between central portion 56 and shoulder member 46. The flanged portion of the annular flanged ring has a diameter that exceeds the diameter of the opening in flap fitting 26 housing central portion 56 of shaft member 40. Therefore, the annular flanged ring formed by retaining member 42 and retaining member 44 is configured to engage flap fitting 26 and to obstruct translating movement of flap roller arrangement 30 in a direction away from flap track 28. The remainder of the annular flanged ring (the portion to the right of the flange from the perspective of FIG. 3) has a diameter that is substantially the same as the diameter of central portion 56 and therefore lies substantially flush with central portion 56.

Figure 4:
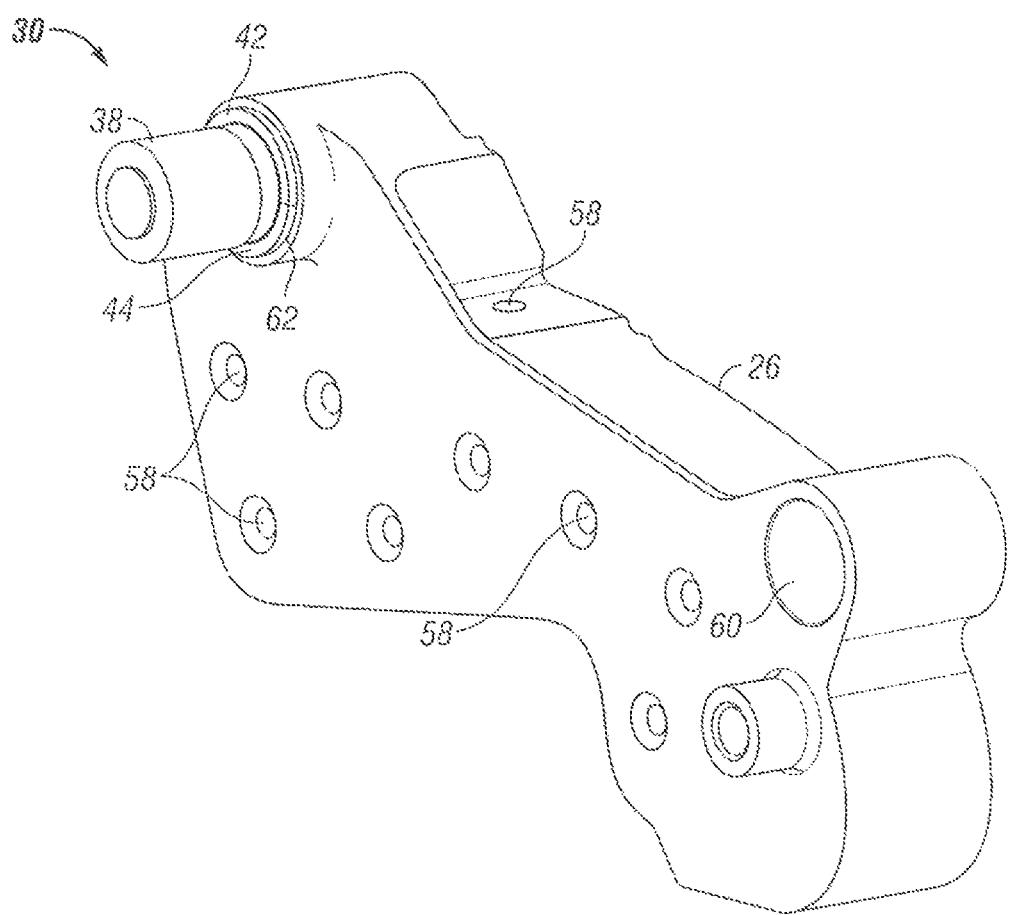
FIG. 4 is an expanded perspective view illustrating the flap fitting and the flap roller arrangement of FIG. 2.

FIG. 4 is an expanded perspective view illustrating flap fitting 26 and flap roller arrangement 30. With continuing reference to FIGS. 1-3, the portion of flap fitting 26 visible in FIG. 4 is the portion that will be positioned proximate flap track 28 when flap 22 is mounted to wing 20. As illustrated, flap fitting 26 includes multiple openings 58 to receive threaded fasteners (such as threaded fasteners 32 in FIG. 2) which attach flap fitting 26 to flap 22. In the illustrated embodiment, openings 58 are countersunk in order to permit threaded fasteners 32 to rest flush with a lateral surface of flap fitting 26.

In the illustrated embodiment, flap fitting 26 includes an opening 60 and an opening 62. Opening 60 and opening 62 are each configured to receive flap roller arrangement 30. As illustrated in FIG. 4, flap roller arrangement 30 has been mounted within opening 62 while opening 60 remains unoccupied. This is for illustration purposes only. In practice, both opening 60 and opening 62 would house a flap roller arrangement 30 when mounting flap 22 to wing 20. The two openings and the use of two flap roller arrangements will permit flap fitting 26 to engage two different flap tracks. By configuring the two different flap tracks to converge and diverge, the angle of flap 22 with respect to a free stream air flow can be controlled.

The view provided by FIG. 4 depicts roller member 38 protruding from flap fitting 26. In this manner, roller member 38 may be inserted into flap track 28 (not shown), thus enabling rolling engagement between flap 22 and wing 20. Also visible in FIG. 4 are retaining member 42 and retaining member 44. As illustrated, while retaining member 42 and retaining member 44 are coupled to flap roller arrangement 30, movement of flap roller arrangement 30 towards the right (from the perspective of FIG. 4) is obstructed.

Figure 5:
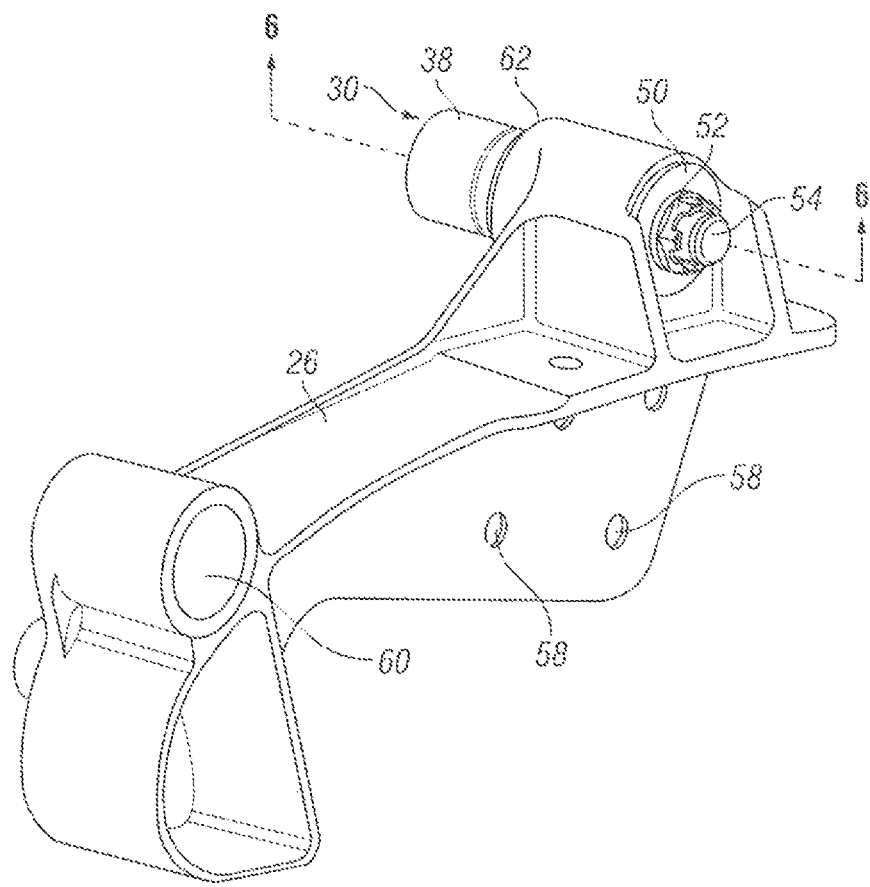
FIG. 5 is another expanded perspective view illustrating the flap fitting and the flap roller arrangement of FIG. 2.

FIG. 5 is an expanded perspective view illustrating an opposite side of flap fitting 26 and flap roller arrangement 30 from that which was depicted in FIG. 4. With continuing reference to FIGS. 1-4, castellated nut 52 is engaged with threaded end 54 and is tightened against washer 50. With castellated nut 52 tightened in this manner, washer 50 is urged against flap fitting 26. Accordingly, when castellated nut 52 is securely tightened, washer 50, retaining member 42, and retaining member 44 cooperate to secure central portion 56 of shaft member 40 within opening 62 of flap fitting 26, with washer 50 obstructing translating movement of flap roller arrangement 30 to the left (from the perspective of FIG. 5) and with retaining member 42 and retaining member 44 cooperating to obstruct translating movement of flap roller arrangement 30 to the right (from the perspective of FIG. 5).

FIG. 6 is a cross sectional, perspective view of flap roller arrangement 30 and a portion of flap fitting 26 taken along section line 6-6 of FIG. 5. FIG. 6 provides the best view of the multiple radial diameters of shaft member 40 at different axial locations. Also visible in FIG. 6 are the cross-sections of retaining member 42 and retaining member 44. In this view, a flanged portion 64 of retaining member 42 and a flanged portion 66 of retaining member 44 can be seen engaging flap fitting 26. Retaining member 42 and retaining member 44 can also be seen engaging shoulder portion 46 of shaft member 40. Configured and positioned as illustrated in FIG. 6, the obstruction caused by retaining member 42 and retaining member 44 which prevents shaft member 40 from translating through opening 62 in flap fitting 26 can be plainly seen. In addition, non-flanged portion 68 of retaining member 42 and non-flanged portion 70 of retaining member 44 are positioned within opening 62 of flap fitting 26. Seated in this manner, non-flanged portion 68 and non-flanged portion 70 are obstructed from moving radially outwardly from shaft member 40 by an inner surface 72 that forms opening 62 in flap fitting 26. Thus, when pulled within opening 62 by the tightening of castellated nut 52 around threaded end 54, retaining member 42 and retaining member 44 are held in place with respect to shaft member 40 and are obstructed from becoming uncoupled from shaft member 40. It should be understood by those of ordinary skill in the art that other configurations or mechanisms or both may be employed to secure retaining member 42 and retaining member 44 to shaft member 40. The advantages of the depicted configuration include both simplicity and a reduced overall part count.

In the embodiment illustrated in FIG. 6, a bore 74 is defined through shaft member 40 proximate threaded end 54. Bore 74 is configured to receive a pin (not shown). The pin, when inserted through bore 74 can be aligned with, and can engage with, the castellations of castellated nut 52. Such engagement between the pin and the castellations of castellated nut 52 can inhibit any inadvertent unscrewing of castellated nut 52 from threaded end 54. In other embodiments, rather than using a pin and a castellated nut, other locking features, such as a Teflon button or any other suitable self locking nut feature may be alternatively be implemented without departing from the teachings of the present disclosure.

Figure 7:
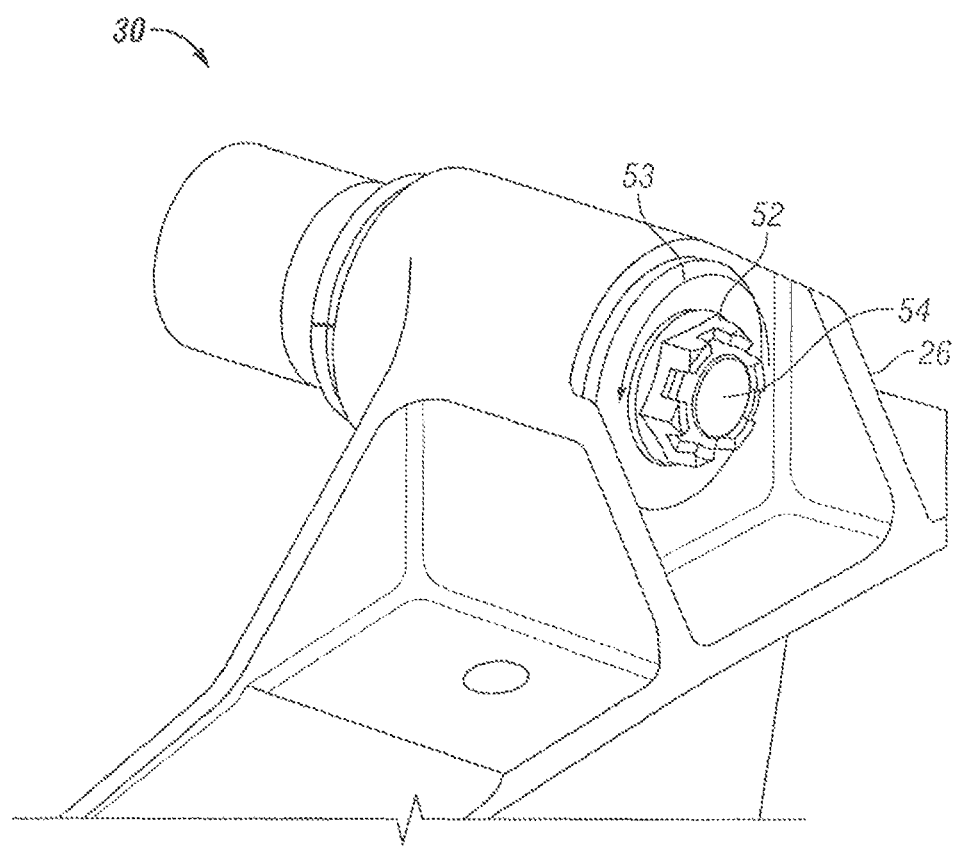
FIG. 7 is a perspective view of the flap roller arrangement and the flap fitting of FIG. 5 during an initial stage of removing a roller assembly from an opening in the flap fitting.

FIG. 7 is a perspective view illustrating an initial stage of a process for removing the flap roller assembly from flap fitting 26. As used herein, the term "flap roller assembly" refers to the shaft member (e.g., shaft member 40) and the roller member (e.g., roller member 38). With continuing reference to FIGS. 1-6, castellated nut 52 is initially rotated in the direction indicated by arrow 53 to loosen castellated nut 52 on threaded end 54. Castellated nut 52 need not be removed from threaded end 54 but rather need only be loosened by an amount that will allow flap roller arrangement 30 to be pushed slightly towards flap track 28.

Figure 8:
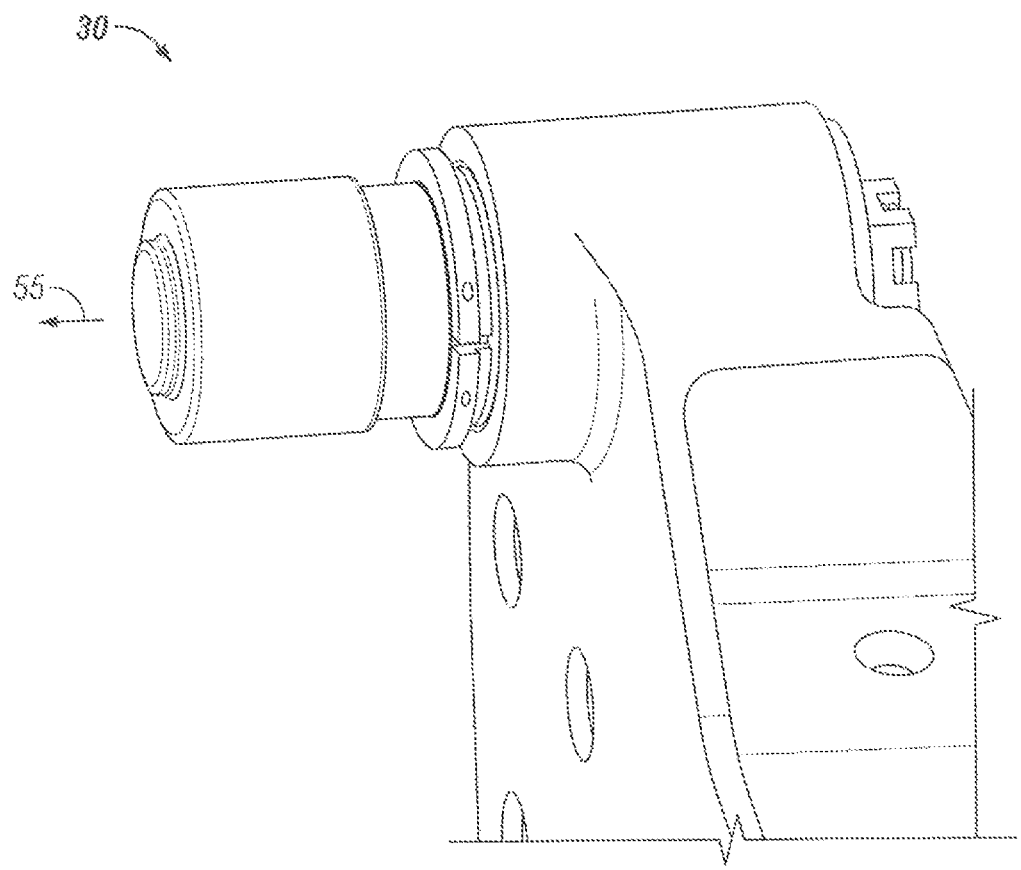
FIG. 8 is a perspective view of the flap roller arrangement and the flap fitting of FIG. 7 during a subsequent stage of removing the roller assembly from an opening in the flap fitting.

FIG. 8 is a perspective view illustrating a stage of the process following FIG. 7 for removing the flap roller assembly from flap fitting 26. With continuing reference to FIGS. 1-7, with castellated nut 52 having been loosened as illustrated in FIG. 7, flap roller arrangement 30 can now be pushed in the direction indicated by arrow 55 such that it will translate in a direction towards flap track 28. This translation has been depicted in FIG. 8. The goal of this translation is to push flap roller arrangement 30 far enough towards flap track 28 such that non-flanged portion 68 of retaining member 42 and non-flanged portion 70 of retaining member 44 are pushed out of opening 62. Once non-flanged portion 68 of retaining member 42 and non-flanged portion 70 of retaining member 44 comes out of opening 62, these portions disengage from inner surface 72 and are free to be removed from flap roller arrangement 30.

Figure 9:
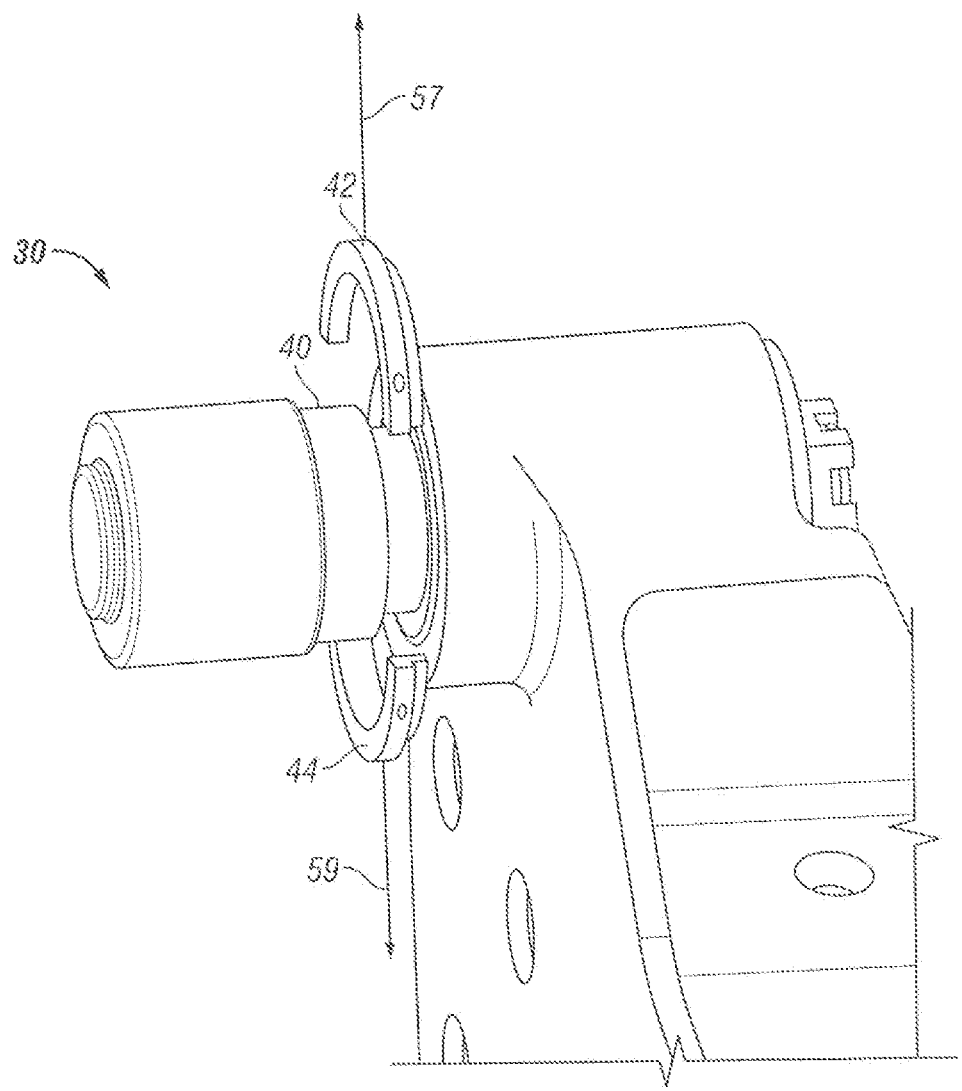
FIG. 9 is a perspective view of the flap roller arrangement and the flap fitting of FIG. 8 during a subsequent stage of removing the roller assembly from an opening in the flap fitting.

FIG. 9 is a perspective view illustrating a stage of the process following FIG. 8 for removing the flap roller assembly from flap fitting 26. With continuing reference to FIGS. 1-8, once flap roller arrangement 30 has translated towards flap track 28 and non-flanged portion 68 of retaining member 42 and non-flanged portion 70 of retaining member 44 have come out of opening 62, retaining member 42 and retaining member 44 may be moved radially outwardly from shaft member 40 in the directions indicated by arrows 57 and 59, respectively, and thereby uncoupled from flap roller arrangement 30. With retaining member 42 and retaining member 44 thus uncoupled from shaft member 40, the shaft assembly (shaft member 40 and roller member 38) are no longer obstructed from translating through opening 62 in a direction away from flap track 28.

Figure 10:
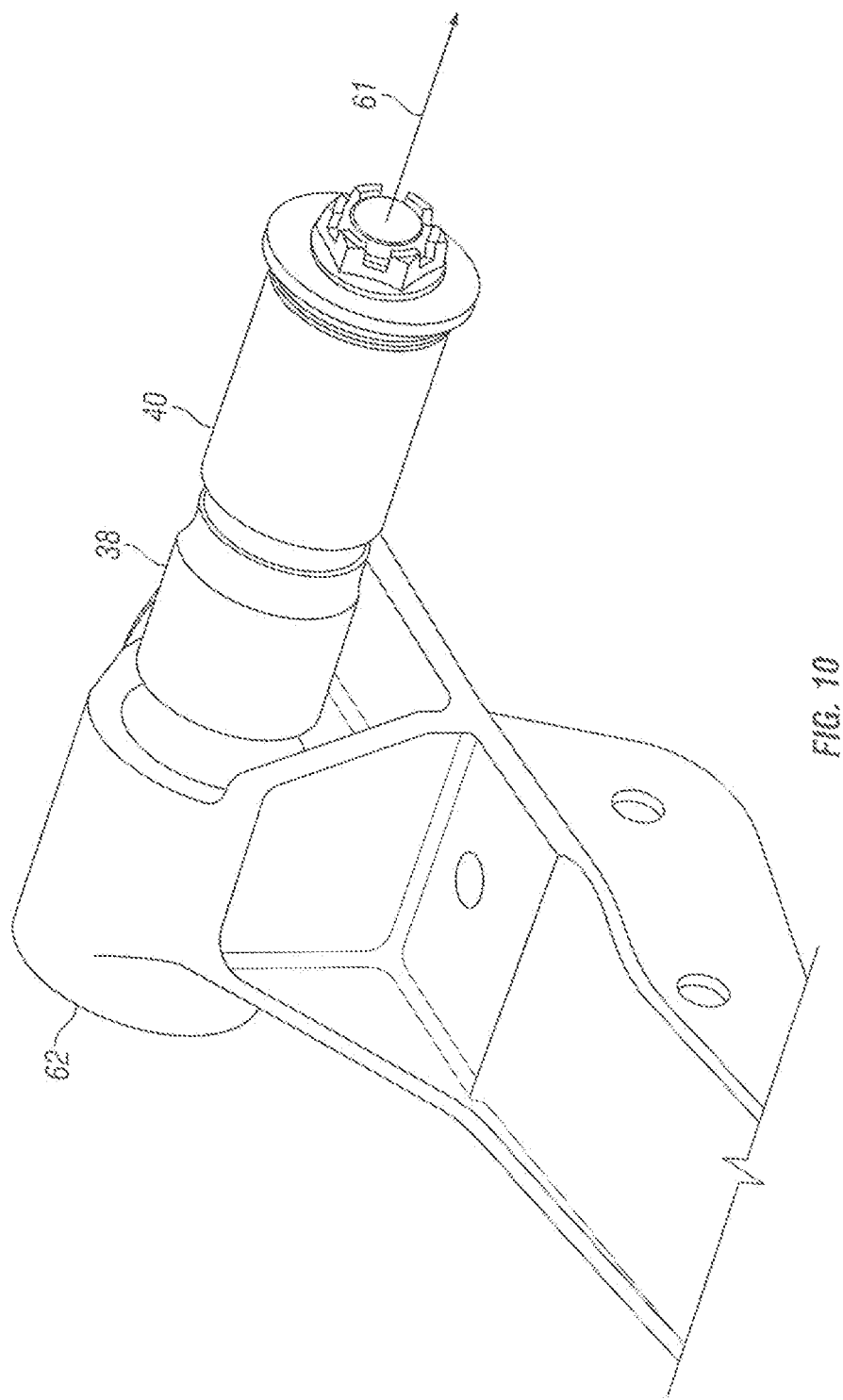
FIG. 10 is a perspective view of a final stage of removing the roller assembly from an opening in the flap fitting.

FIG. 10 is a perspective view illustrating a final stage of a process for removing the flap roller assembly from flap fitting 26. With continuing reference to FIGS. 1-9, with retaining member 42 and retaining member 44 having been uncoupled from shaft member 40, translating movement of the roller assembly in a direction away from flap track 28 is unobstructed. Because roller member 38 has an outer diameter that is less than an inner diameter of opening 62, the roller assembly is free to egress from opening 62 in a direction away from flap track 28 (as indicated by arrow 61).

Figure 11:
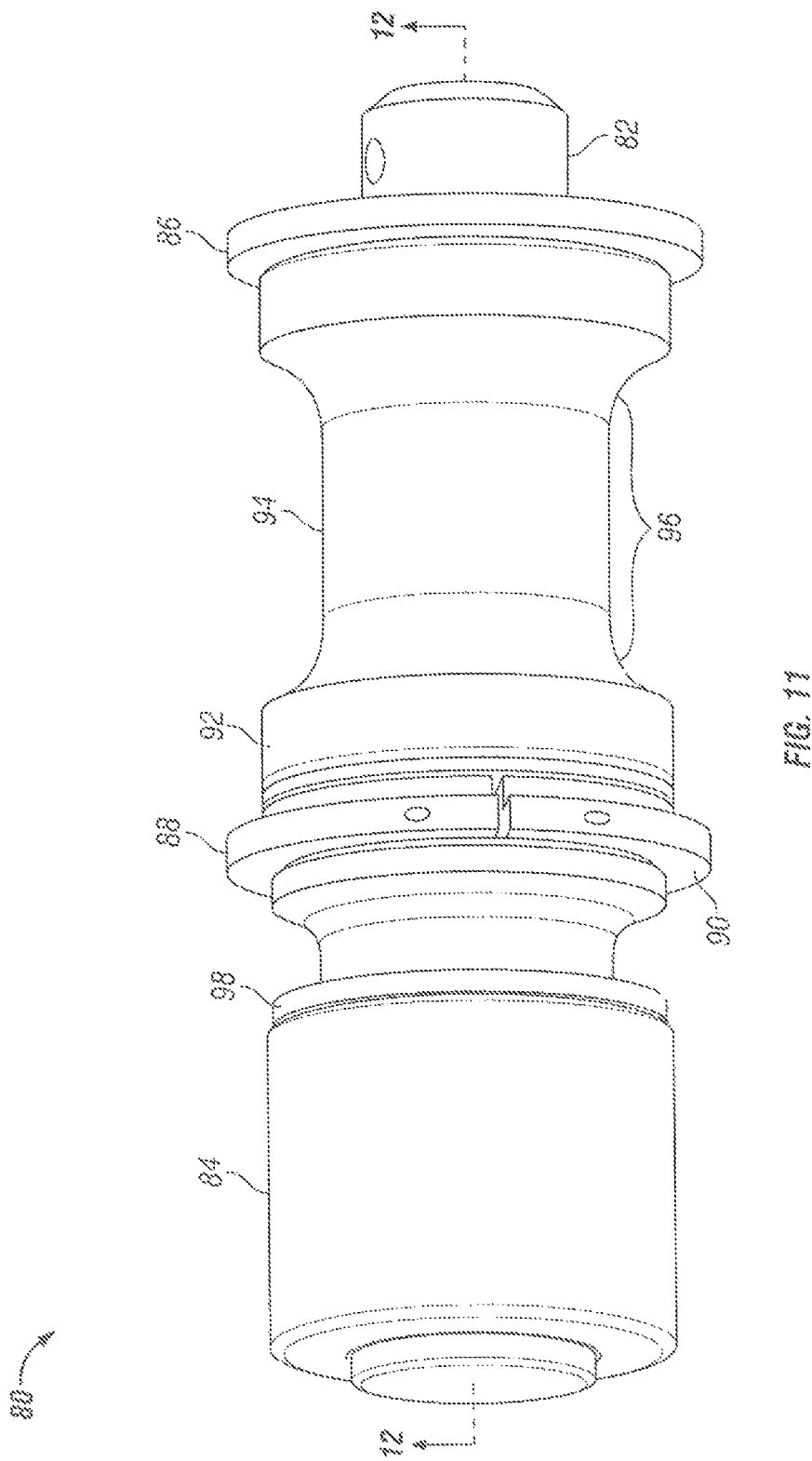
FIG. 11 is a perspective view of an alternate embodiment of a flap roller arrangement made in accordance with the teachings of the present disclosure.

FIG. 11 is a perspective view of an alternate embodiment 80 of a flap roller arrangement made in accordance with the teachings of the present disclosure. Alternate embodiment 80 represents a solution for retrofitting existing roller assemblies so as to permit the removal from their flap fittings in a direction away from the flap track. As described above in the background section, conventional roller assemblies comprise a shaft having a single diameter along its axial length and a roller member rotatably mounted proximate one end of the shaft member. For such conventional roller assemblies, it is anticipated that new flap fittings will be attached to the flap of the wing and that such flap fittings will include openings that have internal diameters that are larger than the outer diameter of the roller members of the conventional roller assemblies. While this will allow the roller members to be extracted through the larger diameter openings when extraction is desired, enlarged diameter of the opening will exceed the diameter of the shaft member. This issue is addressed in alternate embodiment 80 through the use of bushings, as discussed in detail below.

Figure 12:
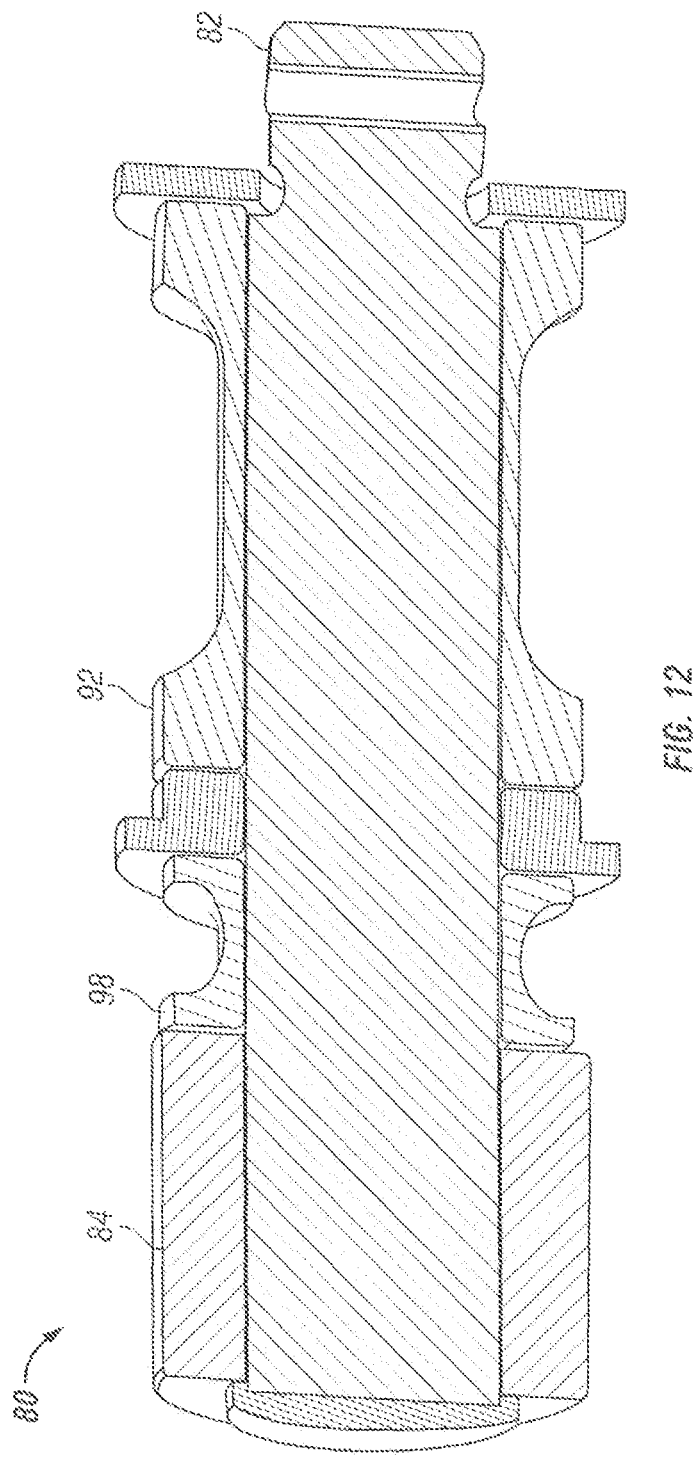
FIG. 12 is a cross-sectional view of the alternate embodiment taken along section line 12-12 of FIG. 11.

As illustrated in FIG. 11, alternate embodiment 80 includes a shaft member 82 having a single diameter along its axial length (as best seen in FIG. 12). With continuing reference to FIGS. 1-11, alternate embodiment 80 further includes a roller member 84 that is substantially identical to roller member 38 and that is rotatably mounted to shaft member 82 proximate an axial end of shaft member 82. Alternate embodiment 80 further includes a washer 86, a retaining member 88, and a retaining member 90 that are each configured to engage flap fitting 26 while alternate embodiment 80 is positioned within opening 62 of flap fitting 26. Washer 86, retaining member 88, and retaining member 90 are substantially identical to washer 50, retaining member 42, and retaining member 44, respectively.

Alternate embodiment 80 further includes a bushing 92 mounted on shaft member 82 and positioned between washer 86 on the one hand and retaining members 88 and 90 on the other hand. Bushing 92 has an inner diameter that is configured to receive shaft member 82 and an outer diameter that is configured to engage opening 62 of flap fitting 26. Configured and positioned in this manner, bushing 92 serves as an interface between shaft member 82 and the inner surface that forms opening 62 in flap fitting 26. Accordingly, bushing 92 serves substantially the same function as that served by central portion 56 of shaft member 40 of flap roller arrangement 30.

In the illustrated embodiment, bushing 92 includes a cutout 94 causing a central portion 96 of bushing 92 to have a decreased outer diameter. Cutout 94 reduces the overall weight of bushing 92. In other embodiments, bushing 92 may not include cutout 94, but rather, may be configured to have a consistent outer diameter. Such a configuration would enhance the strength of bushing 92.

Alternate embodiment 80 further includes a bushing 98 mounted on shaft member 82 and positioned between roller member 84 on the one hand and retaining members 88 and 90 on the other hand. Bushing 98 has an inner diameter that is configured to receive shaft member 82 and an outer diameter that that is substantially the same as an outer diameter of roller member 84. In other embodiments, bushing 98 may have any suitable outer diameter that does not exceed an inner diameter of opening 62 of flap fitting 26. Configured and positioned in this manner, bushing 98 inhibits movement of retaining members 88 and 90 in a direction towards flap track 28. Accordingly, bushing 98 serves substantially the same function as that served by shoulder portion 46 of shaft member 40 of flap roller arrangement 30.

FIG. 12 is a cross-sectional view of alternate embodiment 80 taken along section line 12-12 of FIG. 11. With continuing reference to FIGS. 1-11, the single continuous diameter of shaft member 82 is visible in FIG. 12. By assembling bushing 92 and bushing 98 to shaft member 82, a conventional roller assembly can be retrofitted to be compatible with a new flap fitting 26 that has a wider opening such as opening 62. This will allow alternate embodiment 82 be removed from flap fitting 26 for service/replacement in the manner described above, thus avoiding the need to remove flap 22 from wing 20.

Figure 13:
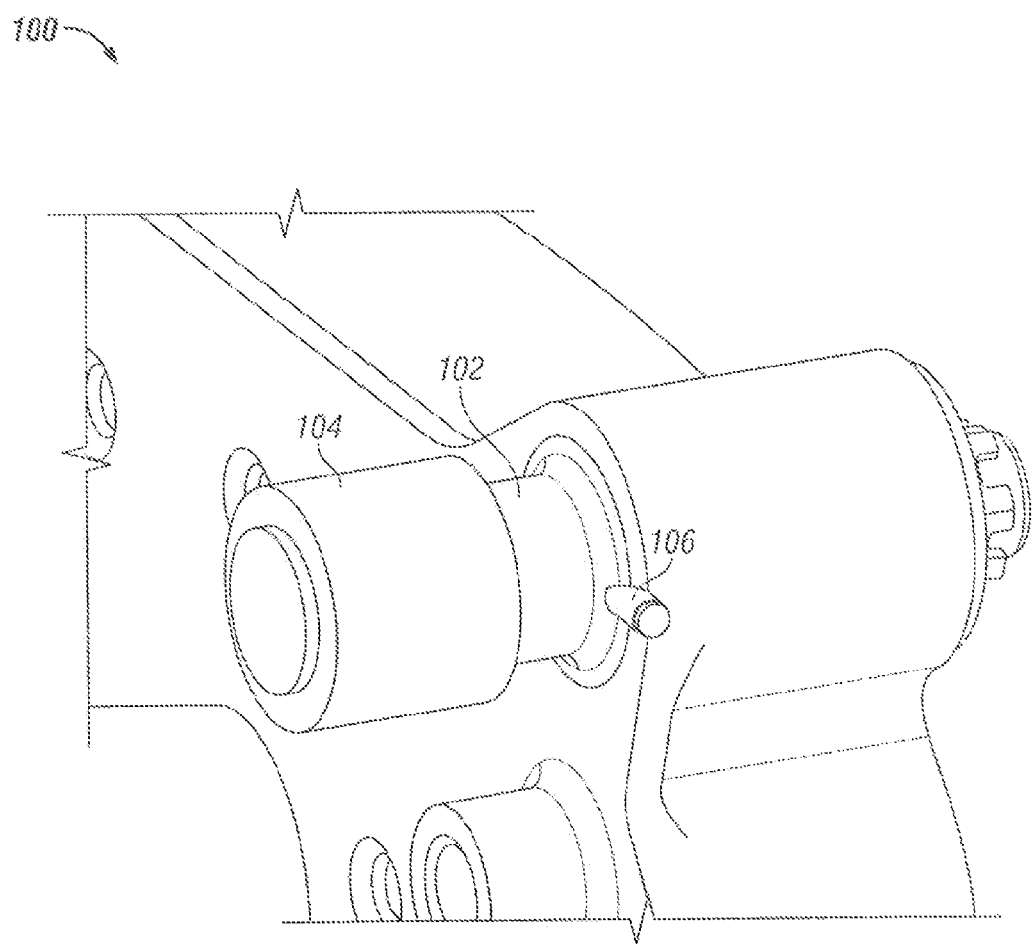
FIG. 13 is a perspective view of another alternate embodiment of a flap roller arrangement made in accordance with the teachings of the present disclosure while the flap roller arrangement is seated within a flap fitting.

FIG. 13 is a perspective view of another alternate embodiment 100 of a flap roller arrangement made in accordance with the teachings of the present disclosure while seated within flap fitting 26. Alternate embodiment 100 includes a shaft member 102, a roller member 104 rotatably mounted to shaft member 102, and a retaining member 106.

Figure 14:
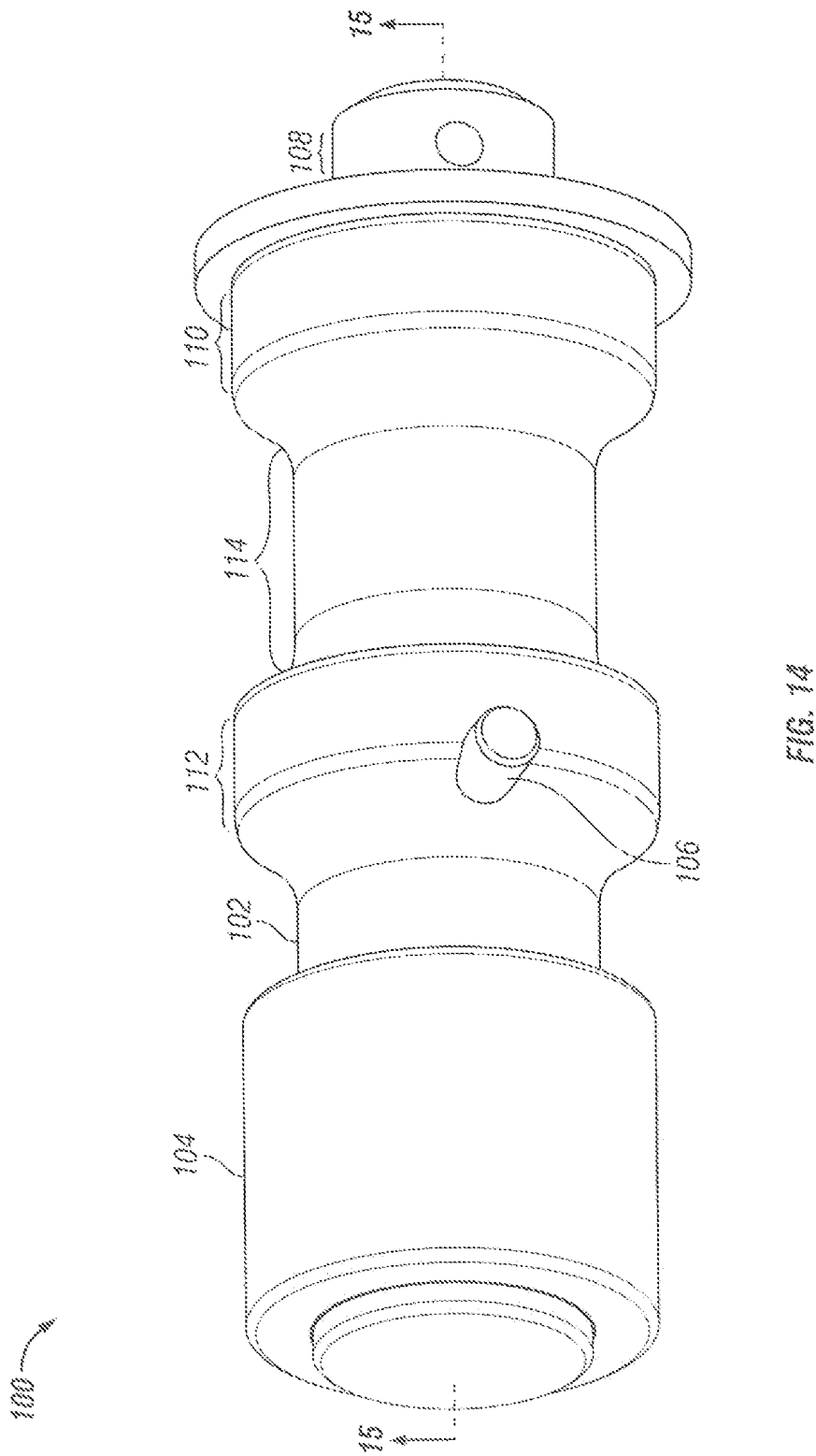
FIG. 14 is a perspective view of the alternate embodiment of the flap roller arrangement of FIG. 13.

FIG. 14 is a perspective view of alternate embodiment 100 removed from the flap fitting 26. With continuing reference to FIGS. 1-12, alternate embodiment 100 is similar to flap roller arrangement 30 in that shaft member 102 has a varying diameter along its axial length as did shaft member 40. For example, shaft member 102 has a narrow threaded axial end 108 to receive a threaded fastener such as a castellated nut (as illustrated in FIG. 13). Shaft member 102 also includes two spaced apart, wide diameter portions, portion 110 and portion 112. Portions 110 and 112 have diameters that are configured to conform to the internal surface of opening 62 in flap fitting 26. Shaft member 102 further includes a narrow diameter central portion, portion 114. Portion 114 has been narrowed down for the purposes of reducing the overall weight of shaft member 102.

Figure 15:
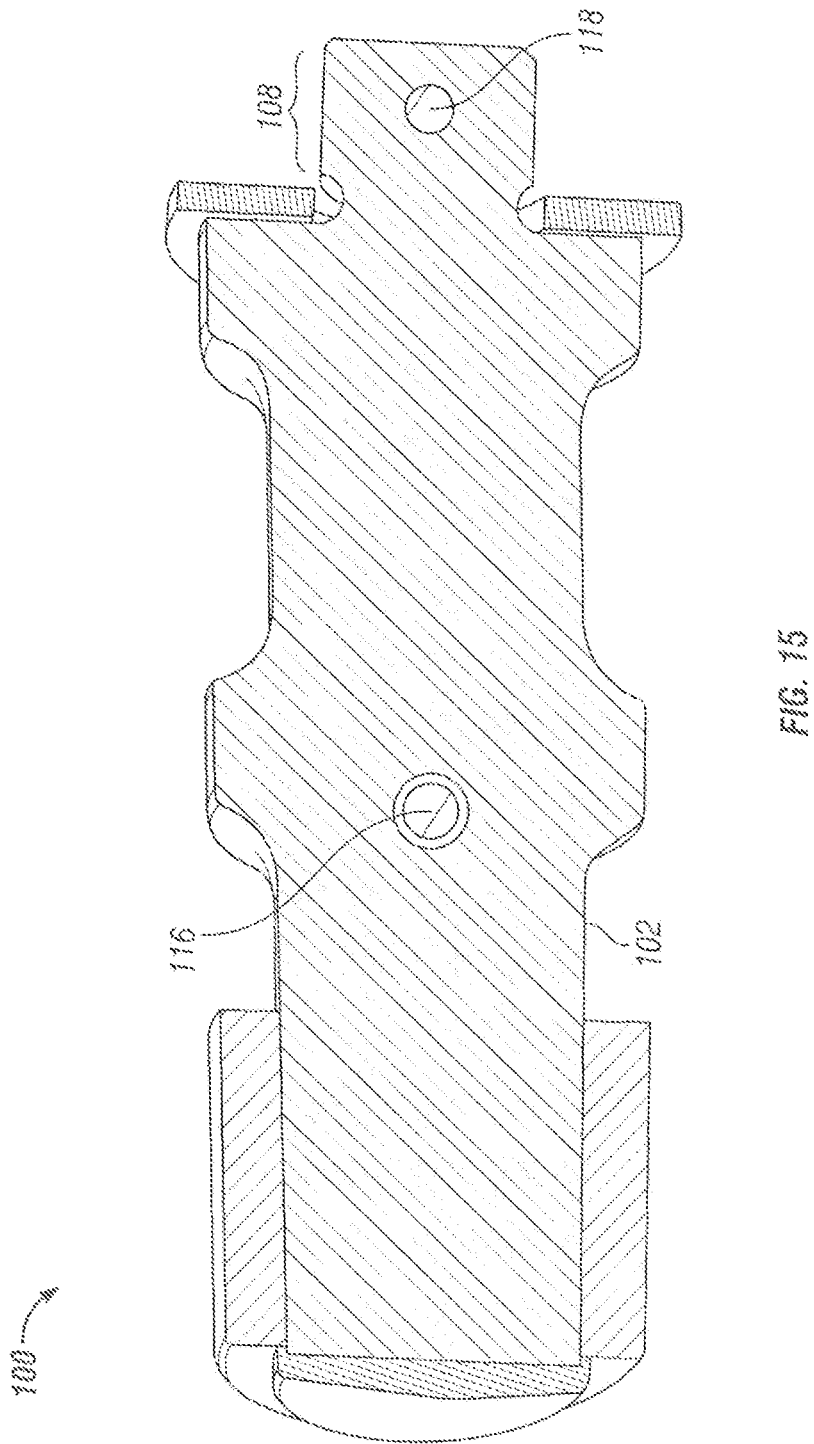
FIG. 15 is a perspective cross-sectional view of the alternate embodiment of the flap roller arrangement taken along section line 15-15 of FIG. 14.

A primary difference between alternate embodiment 100 and flap roller arrangement 30 is the configuration of retaining member 106. In alternate embodiment 100, retaining member 106 comprises a single pin having an axial length that exceeds the diameter of opening 62. Shaft member 102 includes a bore (as best seen in FIG. 15) configured to receive retaining member 106. When positioned within the bore, retaining member 106 extends entirely through shaft member 102 in a direction substantially transverse to an axial length of shaft member 102. When retaining member 106 is positioned within the bore in shaft member 102, retaining member 106 will protrude from both sides of shaft member 102 and will engage flap fitting 26, thereby inhibiting alternate embodiment 100 from translating through opening 62 in a direction away from flap track 28.

In other embodiments, the bore through shaft member 102 may not extend entirely through shaft member 102 and retaining member 106 may therefore protrude from only one side of shaft member 102. In other embodiments, two bores may extend partially through opposite sides of shaft member 102. In such embodiments, two retaining members may be positioned within such oppositely disposed bores to obstruct translating movement of alternate embodiment 100 through opening 62.

FIG. 15 is a perspective cross-sectional view of alternate embodiment 100 taken along section line 15-15 of FIG. 14. With continuing reference to FIGS. 1-14, FIG. 15 clearly illustrates the varying diameters of shaft member 102 at different locations along its axial length. Also illustrated in FIG. 15 is a bore 116 that extends entirely through shaft member 102 and that is configured to receive retaining member 106. Additionally, a bore 118 extends through portion 108 of shaft member 102. Bore 118 is configured to receive a Cotter pin that will engage the castellated nut that is fastened to portion 108.

Figure 16:
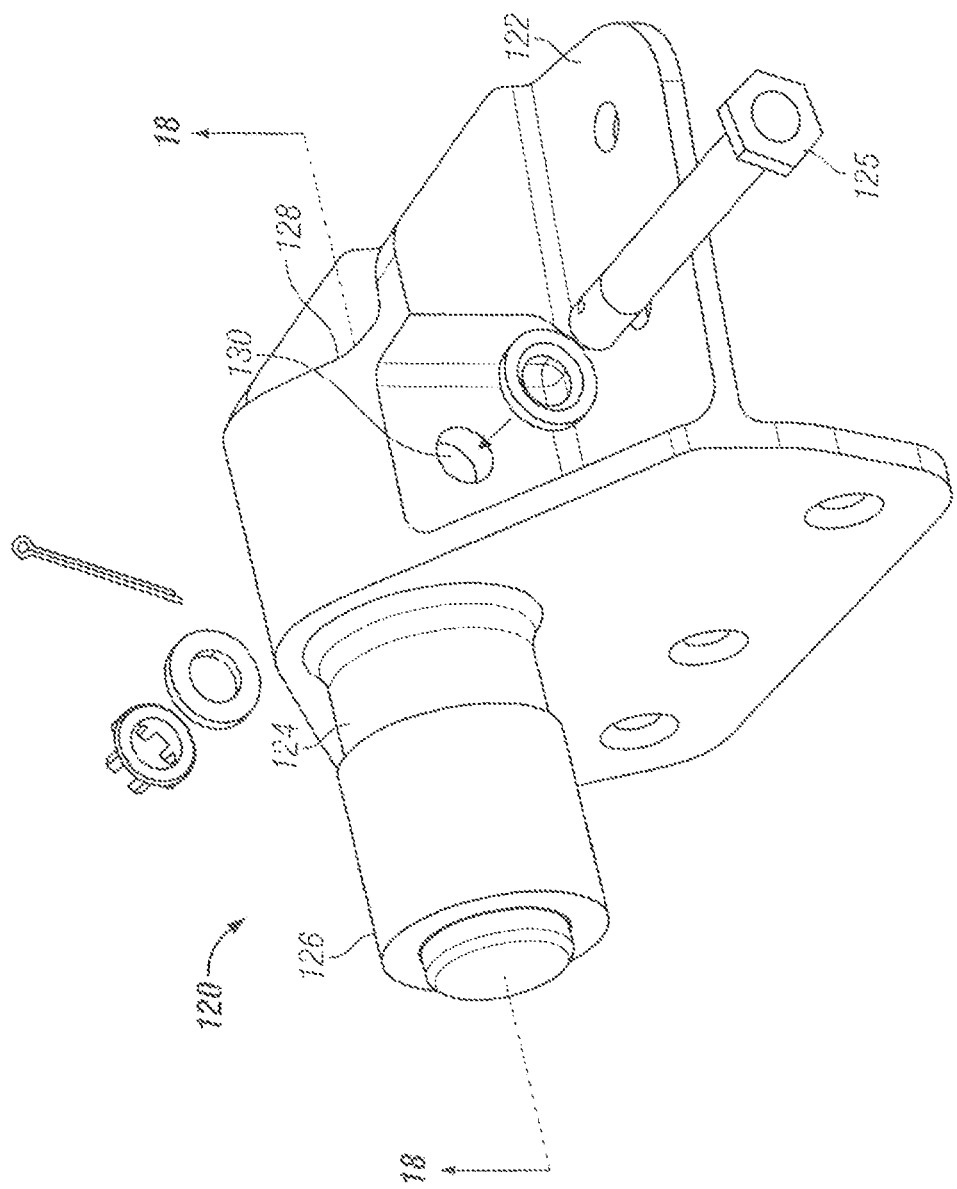
FIG. 16 is a perspective view of yet another alternate embodiment of a flap roller arrangement made in accordance with the teachings of the present disclosure.

FIG. 16 is a perspective view of another alternate embodiment 120 of a flap roller arrangement made in accordance with the teachings of the present disclosure while seated within a flap fitting 122. With continuing reference to FIGS. 1-15, alternate embodiment 120 includes a shaft member 124, a roller member 126 rotatably mounted to shaft member 124, and a retaining member 125 that is configured as a pin that is further configured to be received within a bore defined through shaft member 124. Flap fitting 122 includes an opening 128 to receive alternate embodiment 120. Flap fitting 122 further includes a bore 130 positioned to intersect opening 128. When the bore through shaft member 124 is aligned with bore 130, the retaining member 125 may be inserted through both bore 130 and the bore defined through shaft member 124. Once the retaining member 125 is positioned within the two aligned bores, alternate embodiment 120 is obstructed from translating movement either towards or away from flap track 28. Accordingly, the configuration depicted in FIG. 16 obviates the need for a washer that is configured to obstruct translating movement of the flap roller arrangement towards flap track 28. Furthermore, whereas each of the embodiments discussed above required the loosening of the castellated nut followed by a slight inward push on the flap roller arrangement towards flap track 28 in order to remove the retaining member, the embodiment illustrated in FIG. 16 does not require an initial inward push to permit removal of the retaining member 125. Thus the embodiment depicted in FIG. 16 may allow flap 22 and wing 20 to be assembled to one another with tighter tolerances than would be possible using other embodiments.

Figure 17:
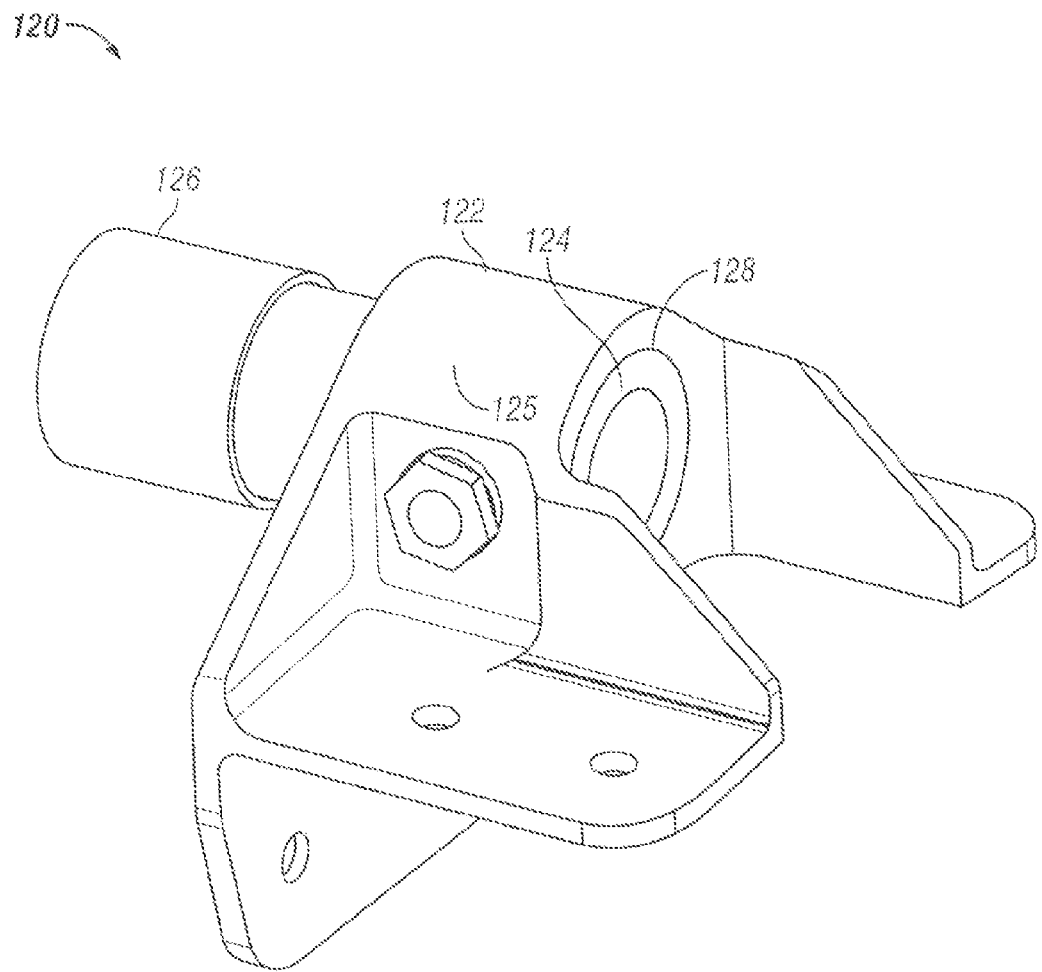
FIG. 17 is another perspective view of the alternate embodiment of the flap roller arrangement of FIG. 16.

FIG. 17 is perspective view illustrating alternate embodiment 120 from a different angle. With continuing reference to FIGS. 1-16, in FIG. 17, engagement between shaft member 124 and the surface forming opening 128 in flap fitting 122 is illustrated. In this view, the retaining member 125 is fully seated within bore 130 and is positioned to obstruct alternate embodiment 120 from translating either towards or away from flap track 28.

Figure 18:
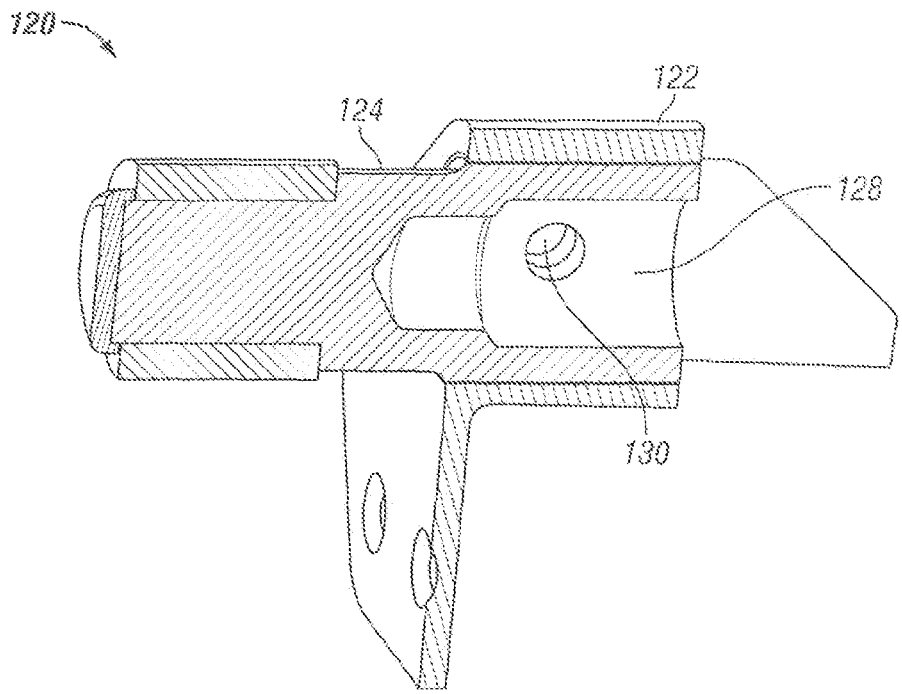
FIG. 18 is a perspective cross-sectional view of the alternate embodiment of the flap roller arrangement taken along section line 18-18 of FIG. 16.

FIG. 18 is a perspective cross-sectional view of alternate embodiment 120 taken along section line 18-18 of FIG. 16. In the embodiment depicted in FIG. 18, shaft member 124 has a hollowed out portion at an axial end where shaft member 124 engages the inner surface that defines opening 128. By hollowing out shaft member 124, the weight of shaft member 124 as well as the overall weight of alternate embodiment 120 can be reduced as compared with a flap roller arrangement that utilizes a solid shaft. In this cross-sectional view, alignment between bore 130 and the bore defined through shaft member 124 is also illustrated.

Figure 19:
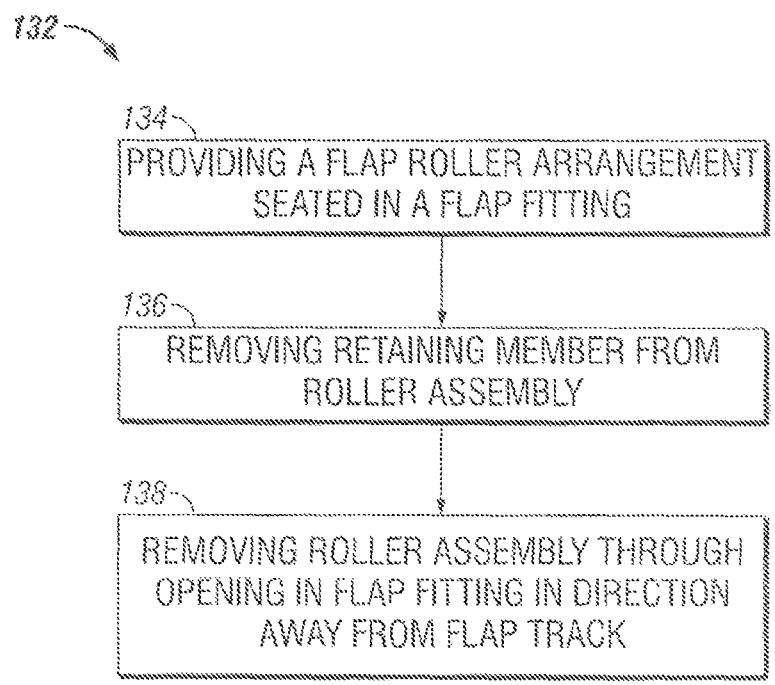
FIG. 19 is a block diagram illustrating an embodiment of a method for removing a flap roller arrangement from a flap fitting.

FIG. 19 is a block diagram illustrating an embodiment of a method 132 for removing a flap roller arrangement from a flap fitting. At step 134, a flap roller arrangement is provided and seated in an operational position in an opening in a flap fitting. The flap roller arrangement may be any one of the embodiments described above or any other embodiment that includes a roller assembly that is configured for rolling engagement with a flap track of the wing and for engagement with the flap fitting, and that further includes a retaining member that is removably coupled to the roller assembly. In such embodiments, the roller assembly will need to be configured to egress through an opening in the flap fitting in a direction away from the flap track, the retaining member will need to be configured to obstruct egress of the roller assembly through the opening when the retaining member is coupled to the roller assembly, and the roller assembly will need to be able to egress through the opening when the retaining member is removed from the roller assembly.

Next, in step 136, the retaining member is removed from the roller assembly. In some embodiments, the retaining member may be held in place by an interference fit, by a friction fit, or through an obstructing relationship with the flap fitting or some other member. In such cases, the condition that inhibits the retaining member from becoming uncoupled from the roller assembly will need to be alleviated. This may entail loosening a fastener and slightly translating the roller assembly briefly towards the flap track. In other embodiments, removing the retaining member may entail loosening and/or removing a fastener that is configured to attach the retaining member to the roller assembly.

Finally, in step 138, after the retaining member has been removed, the roller assembly may then be removed. This is accomplished by translating the roller assembly through an opening in the flap fitting in a direction that moves the roller assembly away from the flap track.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A flap roller arrangement for supporting a flap on a wing of an aircraft, the flap roller arrangement comprising:
    a roller assembly configured for rolling engagement with a flap track of the wing and for engagement with a flap fitting; and
    a retaining member removably coupled to the roller assembly,
    wherein the roller assembly is configured to egress through an opening in the flap fitting in a direction away from the flap track, wherein the retaining member is configured to obstruct egress of the roller assembly through the opening when the retaining member is coupled to the roller assembly, and wherein the roller assembly is enabled to egress through the opening when the retaining member is removed from the roller assembly, and
    wherein the roller assembly moves fore and aft with respect to the wing along the flap track when the roller assembly is engaged with the flap fitting and when the flap moves fore and aft with respect to the wing.

2. The flap roller arrangement of claim 1, wherein the retaining member is further configured to engage the flap fitting.

3. The flap roller arrangement of claim 2, wherein the retaining member is further configured to partially enter the opening when coupled to the roller assembly and still further configured to be held in place with respect to the roller assembly when partially inserted into the opening while coupled to the roller assembly.

4. The flap roller arrangement of claim 1, wherein the roller assembly comprises a roller member rotatably mounted to a shaft member.

5. The flap roller arrangement of claim 4, wherein the shaft member is configured to receive the retaining member.

6. The flap roller arrangement of claim 4, wherein the shaft member defines a notch to receive the retaining member.

7. The flap roller arrangement of claim 4, wherein the shaft member defines a shoulder portion configured to engage the retaining member.

8. The flap roller arrangement of claim 4, wherein the roller member has a first diameter, wherein the opening has a second diameter, and wherein the second diameter exceeds the first diameter.

9. The flap roller arrangement of claim 1, further comprising a second retaining member configured to cooperate with the retaining member.

10. The flap roller arrangement of claim 9, wherein the retaining member and the second retaining member together comprise an annular ring configured to fit around the roller assembly.

11. The flap roller arrangement of claim 10, wherein the annular ring includes a flange configured to obstruct egress of the roller assembly through the opening in the direction away from the flap track.

12. The flap roller arrangement of claim 1, wherein the retaining member comprises a pin.

13. The flap roller arrangement of claim 12, wherein the pin is configured to extend entirely through the roller assembly.

14. The flap roller arrangement of claim 13, wherein the pin is further configured to engage the flap fitting.

15. The flap roller arrangement of claim 14, wherein the pin is further configured to extend through a second opening in the flap fitting.

16. The flap roller arrangement of claim 1, further comprising a first bushing configured to engage a wall of the opening.

17. The flap roller arrangement of claim 1, further comprising a second bushing configured to engage the retaining member.

18. The flap roller arrangement of claim 1, wherein the roller assembly defines a cut-out.

19. A flap assembly for use with a wing of an aircraft, the flap assembly comprising:
   a flap;
   a flap fitting attached to the flap, the flap fitting including an opening;
   a roller assembly mounted within the opening, the roller assembly configured for rolling engagement with a flap track of the wing; and
   a retaining member removably coupled to the roller assembly,
   wherein the roller assembly is configured to egress through the opening in a direction away from the flap track,
   wherein the retaining member is configured to obstruct egress of the roller assembly through the opening when the retaining member is coupled to the roller assembly, and wherein the roller assembly is enabled to egress through the opening when the retaining member is removed from the roller assembly, and
   wherein the roller assembly moves fore and aft with respect to the wing along the flap track when the roller assembly is engaged with the flap fitting and when the flap moves fore and aft with respect to the wing.

20. A method for removing a roller assembly from a flap fitting, the method comprising the steps of:
   providing a flap roller arrangement seated in the flap fitting, the flap roller arrangement including the roller assembly configured for rolling engagement with a flap track of a wing and for engagement with the flap fitting, and further including a retaining member removably coupled to the roller assembly, the roller assembly being configured to egress through an opening in the flap fitting in a direction away from the flap track, the retaining member being configured to obstruct egress of the roller assembly through the opening when the retaining member is coupled to the roller assembly, the roller assembly being enabled to egress through the opening when the retaining member is removed from the roller assembly;
   removing the retaining member from the roller assembly; and
   removing the roller assembly through the opening in the direction away from the flap track.

* * * * *